Feb. 28, 1933. S. S. LEAF 1,899,511
ICE CREAM SANDWICH
Filed Dec. 8, 1931
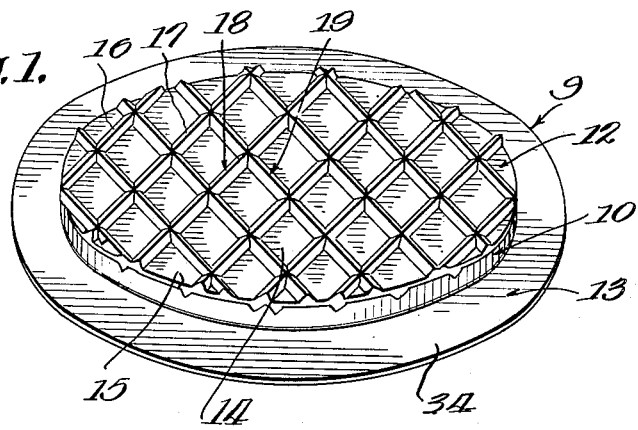
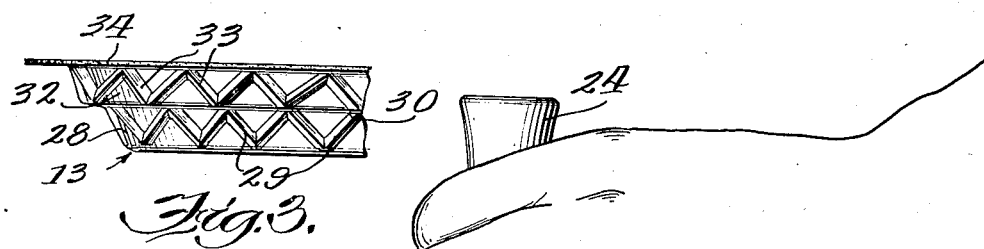
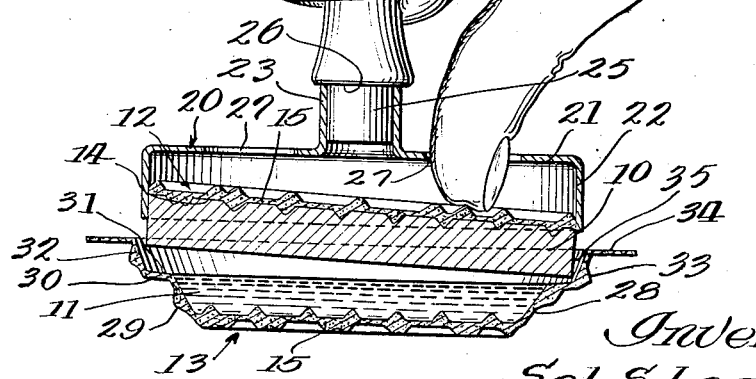
Inventor:
Sol S Leaf
By Williams Bradbury,
McCaleb & Hinkle,
Attys.

Patented Feb. 28, 1933

1,899,511

UNITED STATES PATENT OFFICE

SOL S. LEAF, OF CHICAGO, ILLINOIS, ASSIGNOR TO OVERLAND CANDY CORPORATION, OF CHICAGO, ILLINOIS, A CORPORATION OF ILLINOIS

ICE CREAM SANDWICH

Application filed December 8, 1931. Serial No. 579,747.

The present invention relates to ice cream sandwiches, and is particularly concerned with the provision of an improved ice cream sandwich adapted to be used in combination with sauce or any of the other food products generally utilized with ice cream in preparing "sundaes".

While the present wafer is peculiarly adapted for the manufacture of ice cream sandwiches, it should be understood that the wafer itself is capable of other uses, and I do not limit myself to its use with ice cream, except as set forth in the appended claims.

The embodiment which has been selected to illustrate the invention consists of an ice cream sandwich, but the wafers may also be used with ices, sherbets, frozen custards, confectionery icing, chocolate icing, candy, sugar wafer filler, bon bon cream, caramel, nougat, etc., and the terms "food filler" or "confection" are used throughout the present specification and claims as generic terms, including all products of similar characteristics capable of cooperating with the wafers in the manner described herein, or which it may be desirable to combine with wafers as disclosed in this application.

One of the objects of the present invention is the provision of an improved ice cream sandwich and wafer for making such sandwiches, which is more convenient, more economical and more salable than the sandwiches of the prior art.

Another object is the provision of an improved ice cream sandwich and wafer for making such sandwiches, by means of which the wafers are fastened more securely to the ice cream to form a unitary product which is less apt to break, separate or disintegrate while the sandwich is being eaten or handled.

Another object is the provision of an improved ice cream sandwich and wafer, by means of which the dripping of the melting ice cream from the interior of the sandwich is prevented for a reasonable length of time, thereby rendering the sandwich capable of convenient handling while it is being eaten, and rendering the sandwich more sanitary than the products of the prior art.

Another object is the provision of an improved wafer structure for ice cream sandwiches, which is more economical in the use of batter, but which possesses greater strength than the wafers of the prior art, although less material may be used, and although the wafer may be made more crispy than the prior wafers.

Another object of the invention is the provision of an improved ice cream sandwich wafer peculiarly adapted to receive sauce or other liquid constituents adapted to be used with ice cream in forming confections such as sundaes, in which the ice cream is associated with various flavoring materials.

Another object of the invention is the provision of an improved ice cream sandwich having provision for receiving and supporting syrup or sauce in such manner that the syrup will not be lost when the sandwich is eaten by hand.

Another object of the invention is the provision of an improved ice cream sandwich wafer adapted to receive syrup or sauce and shaped to prevent the ice cream from squeezing the sauce out of the sandwich when the wafer is assembled with the other ingredients of the sandwich.

Another object is the provision of an improved method of making ice cream sandwiches.

Other objects and advantages of the invention will be apparent from the following description, and from the accompanying drawing, in which similar characters of reference indicate similar parts throughout the several views.

Referring to the single sheet of drawing,

Figure 1 is a view in perspective of an improved ice cream sandwich made according to the present invention;

Figure 2 is an elevational view with the sandwich and mold in section along a vertical plane, showing the details of the construction of the wafer and sandwich and the method of making the sandwiches; and Figure 3 is a side elevational view of the lower wafer.

The ice cream sandwich, which is indicated in its entirety by the numeral 9 in Figure 1, preferably consists of a filler 10 of ice cream, a filler of sauce or syrup 11, an upper wafer 12, and a lower wafer or plate 13. The body portions of both the wafers 12 and 13 may be identical in form, but are generally reversed in position in the sandwich for the purpose of locating the wafers with the side having the deepest recesses 14 adjacent the ice cream, but many of the advantages of the invention may be realized by using either side of the wafer adjacent the ice cream filler.

The wafers comprise baked, crisp and light food products which may be made out of the conventional batter containing milk, eggs, cane sugar and other selected ingredients and any of the conventional recipes for making wafers of this type may be employed. The wafers constructed according to the present invention may be crispier than the wafers of the prior art, thereby improving the palatable characteristics of the wafer without substantially diminishing its strength, due to the improved structure of the wafer described hereinafter.

The greater thinness of the parts of the present wafers gives a more even distribution of batter, which results in better heat distribution, more thorough baking and quicker baking, thereby permitting the use of more sugar, which is a desirable ingredient but one that is difficult to handle on account of the tendency toward stickiness or caramelization.

The present wafers are preferably formed with a body or web 15 of minimum thickness as distinguished from the wafers of the prior art, which were provided with a body of substantial thickness and in some cases with relatively small raised formations, but none of the wafers of the prior art were provided with formations capable of producing the results accomplished by the present wafers. The web or body 15 is made relatively thin by bringing the waffle plates very close together, but the strength of the wafer is provided by a multiplicity of ribs 16, 17, 18, 19, preferably upon both sides of the body 15.

The ribs 18 and 19 are preferably formed as a parallel series of ribs extending across the surface of the wafer and equally spaced from each other with the series of ribs 18 crossing and intersecting the series of ribs 19. The ribs 18 and 19 surround spaces or recesses 14 which are capable of receiving a part of the ice cream filler when the sandwich is made, and also receiving and retaining the melted part of the ice cream in the interior of the sandwich for a reasonable length of time.

The ribs 16–19 are preferably of substantially V-shape as shown, and the ribs are preferably relatively high as compared with the web or body 15 which is of minimum thickness, so that the major portion of the batter is utilized in the formation of the ribs which give the wafer most of its strength. This also renders the recesses 14 deeper and tends to maintain the wafers in their proper position with respect to the ice cream filler, and to each other, preventing the sliding of the wafer on the filler and also preventing the separation of the wafer from the ice cream filler by virtue of the suction which would be generated in the recesses 14 by pulling the wafer off the filler.

It should be noted that the ribs need not all be of the same size, depth or shape, depending upon the appearance desired, and other reinforcing formations may be used.

The ribs 16 and 17 on the other side of the wafer are preferably similar in form and arrangement to the ribs 18 and 19, but the ribs 16 and 17 are preferably spaced a greater distance apart from each other than the ribs 18 and 19, so that the ribs 16 and 17 on one side of the wafer do not register with the ribs 18 and 19 on the opposite side. This arrangement and spacing of the ribs stagger the ribs on one side of the wafer with the ribs on the opposite side, increasing the bending strength of the finished wafer but not substantially increasing the shearing strength.

It will thus be observed that the improved wafer structure makes the wafers of sufficient strength so that they are not readily broken during the handling of the wafer or sandwich, and in the eating of the sandwich it is found that the wafer is more crispy and capable of being bitten off with a portion of the filler without the possibility of breaking the wafer at other points or the possibility of the wafer crumbling in the hands of the consumer.

The present wafer also presents a substantial thickness which improves the appearance, depth and palatable characteristics of the sandwich, thereby producing a sandwich, the parts of which are more appropriately proportioned to each other. The present wafer structure is more economical of batter than the wafers of the prior art, on account of the relatively thin body or web and the use of the transverse ribs instead of the thicker bodies which were used in the prior wafers, and this saving in batter is accomplished without sacrificing the strength of the finished product, but on the contrary, the product may be made more crispy and provided with more desirable palatable characteristics when the present structure is used.

The present ice cream sandwiches may be made of various shapes, and square or rectangular wafers may be provided for the purpose of forming sandwiches with a filler made from ice cream bricks, but the wafers and sandwiches are preferably made substantially circular as illustrated.

The lower wafer 13 has its body or web 15 substantially the same shape as the upper wafer 12, but the lower wafer is preferably provided with an upwardly extending frusto-conical wall 28 which may also be formed with ornamental or reinforcing ribs 29. The wall 28 carries a radially extending flange 30 forming an annular shoulder 31 on the inside of the wafer 13, and the flange 30 carries an upwardly extending frusto-conical or cylindrical wall 32. The wall 32 may also be provided with ornamental and reinforcing ribs 33 and the wall 32 preferably carries a radially extending flange 34. In some embodiments of the invention, the radially extending flange 34 may be cut off but this radially extending flange is also advantageous in giving an indication of the melting of the ice cream which appears on this flange before dripping occurs.

The provision of the frusto-conical wall 32 also permits the insertion of the ice cream filler 10 with greater facility and provides an annular groove 35 for receiving the melted ice cream before any dripping occurs.

The space within the wall 28 above the body 15 of the lower wafer 13 may be filled with syrup or sauce, nuts, ice cream of a different flavor, fruit pulp or cooked fruit of any kind, or with any of the various ingredients which are used by the operators of soda fountains to make sundaes or other attractive confections consisting of a combination of various ingredients. The syrup used is preferably quite thick in order to prevent running of the syrup, and the annular shoulder 31 is utilized for supporting the ice cream filler 10 and preventing the ice cream filler from forcing out the syrup after a part of the side of the lower wafer 13 has been eaten away.

The present wafer is preferably constructed by the use of the improved mold shown in my prior application, Serial No. 456,603, filed May 28, 1930, and shown in Figure 2. This mold preferably consists of a stamped sheet metal member 20 having a relatively flat bottom 21 and an annular or cylindrical wall 22. The height of the wall 22 depends on the thickness of the sandwich desired, and the annular space 35 is also adapted to receive the cylindrical metal flange 22 in the formation of the sandwich.

The mold 20 is preferably provided with a centrally located pressed tubular formation 23 which is secured to a handle, such as a wooden handle 24 having a reduced portion 25 which is frictionally secured in the tubular portion 23 by a pressed fit. The annular shoulder 26 on handle 24 determines the final position of the handle in the tubular formation 23.

The present mold is preferably provided with one or more apertures 27 of sufficient size to pass the thumb of the operator and the use of the apertures 27 will be described in detail hereinafter.

The sandwich is preferably formed by first filling the lower wafer 13 with the sauce, ice cream or other filler 11 intended to be placed in the lower recess of that wafer. During this operation the lower wafer 13 is of course supported upon a table or other appropriate support. The mold 20 is then inverted and the upper wafer 12 placed on the bottom surface 21. The remaining space inside the wall 22 may be filled with ice cream or similar material by pressing the ice cream into the mold and into close engagement with the wafer to fill all of the depressions in the wafer, and the ice cream is leveled off at the top of the mold. The mold is then inverted and inserted into the recess formed by the wall 32 of the lower wafer, after which the operator inserts his thumb in one of the apertures 27, as shown in Figure 2, and forces the upper wafer and ice cream filler out upon the annular surface 31. The mold may then be withdrawn and the sandwich is preferably held together by means of the hand while it is being eaten. If the syrup which is utilized is relatively thin, it is necessary to hold the open part of the sandwich upward as a part of the wall is eaten away, but if a relatively thick syrup or non-fluid filler 11 is used, this difficulty would not be experienced.

It will thus be observed that I have invented an improved ice cream sandwich by means of which ice cream sundae sandwiches may be constructed, and the present sandwich presents many more possibilities for ingenuity and individuality on the part of the operator of the ice cream soda fountain in meeting the tastes of his patrons. Many very delectable confections may be constructed by means of the present ice cream sandwich wafers and if desired additional offsets may be formed in the lower wafer to make further chambers for receiving ingredients.

Wafers of the type shown on the upper side in Fig. 1 may also be interposed between the ice cream and the syrup, or two of the wafers of the type shown at the bottom in Fig. 2 may be combined with ice cream and sauce, thereby forming several sauce or syrup chambers.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. An ice cream sandwich comprising a baked crispy wafer formed with a relatively flat bottomed surface and with an upwardly extending wall, an annular supporting surface formed on said wall, a filling in said wafer, a filling of a different character supported upon said annular supporting surface, and a secondary wafer covering said latter filling.

2. An ice cream sandwich comprising a baked crispy wafer formed with a relatively flat bottomed surface and with an upwardly extending wall, an annular supporting surface formed on said wall, a filling in said wafer, a filling of a different character supported upon said annular supporting surface, and a secondary wafer covering said latter filling, said wafers being formed with deep reinforcing ribs on both sides and with a relatively thin supporting web.

3. An ice cream sandwich comprising a bottom formed with an upwardly extending peripheral wall for receiving a syrup, a radially extending wall for supporting an ice cream filling, an upwardly extending wall around said ice cream filling for preventing leakage, said latter wall having a radially extending flange, an ice cream filling carried by said radially extending wall, and a secondary wafer on the opposite side of said ice cream filler.

4. An ice cream sandwich comprising a baked crispy wafer formed like a plate with an annular supporting surface in said plate, a filling of ice cream on said annular supporting surface, a filling of flavoring material in said plate below said annular surface, and a secondary wafer having relatively deep depressions filled with said ice cream filler and adapted to be retained on said ice cream filler by suction.

In testimony whereof, I hereunto subscribe my name this 3rd day of December, 1931.

SOL S. LEAF.